June 4, 1957  F. NOE  2,794,691
BEARING MOUNTING
Filed Nov. 5, 1953
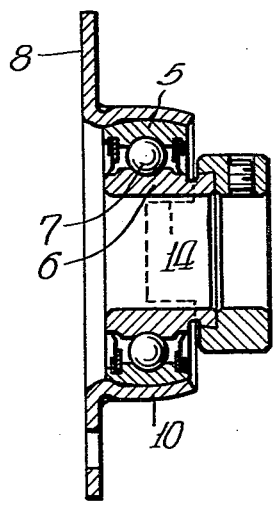
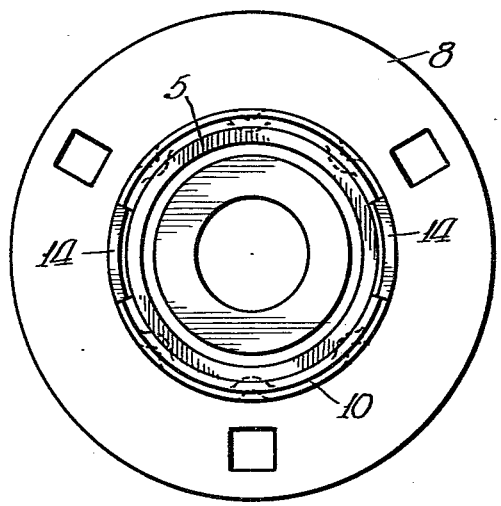
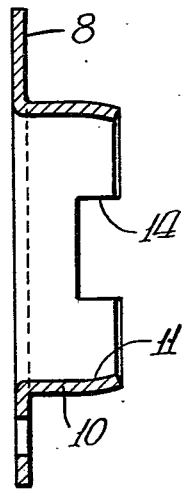
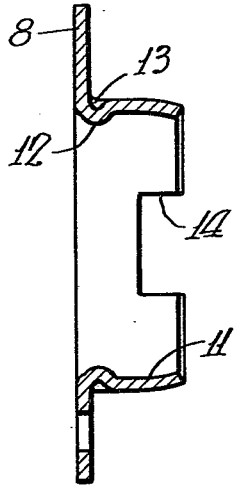
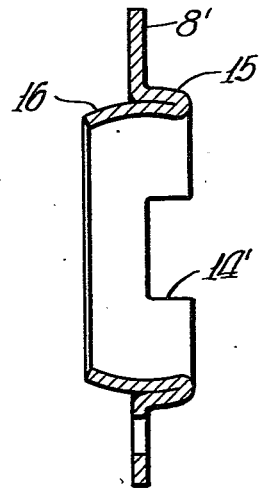
INVENTOR.
Frank Noe
BY Mitchell Burhert
ATTORNEYS

2,794,691

BEARING MOUNTING

Frank Noe, New Britain, Conn., assignor to the Fafnir Bearing Company, New Britain, Conn., a corporation of Connecticut Application November 5, 1953, Serial No. 390,301

1 Claim. (Cl. 308—72)

My invention relates to a bearing housing and more particularly to a flange mounting to be secured to a support and carry an antifriction or like bearing.

It is an object of the invention to provide an exceedingly simple yet sturdy bearing mounting which is easy to fabricate and relatively inexpensive.

It is a further object to provide a bearing mounting which is formed of a single part which may be of pressed metal or the like.

Another object is to provide a flange mounting for a bearing which may be formed of sheet metal or the like and wherein the bearing housing portion is located substantially completely at one side of the flange plate thereof, so that the bearing mounting may be located against a blank wall.

Other objects and various features of novelty and invention will be hereinafter pointed out, or will become apparent to those skilled in the art.

In the drawings, which show, for illustrative purposes only, preferred forms of the invention:

Fig. 1 is a view in central vertical section of a bearing housing with a bearing in place and illustrating the invention;

Fig. 2 is a view in axial end elevation of the bearing and housing shown in Fig. 1;

Fig. 3 is a view in central vertical section of a bearing housing illustrating one step in its manufacture;

Fig. 4 is a view similar to Fig. 3, and illustrating a further step in the manufacture of the housing;

Fig. 5 is a central vertical section of a bearing housing similar to those heretofore illustrated, but showing a slight modification.

In the drawings, the bearing housing is of the flange type and is designed to house a bearing such as the antifriction bearing, having an outer ring 5, and inner ring 6, with interposed antifriction bearing members 7. In the form illustrated, the outer ring is crowned in cross-section, or is of substantially spherical outer section to fit within the housing to be described.

The bearing housing, as indicated and as illustrated, is of the flange type and includes a flange or plate 8, preferably of disc form, having mounting openings 9 therein, which openings are preferably of angular section to receive carriage bolts or other fasteners having shanks of angular section, as will be understood. The flange disc 8 is designed to fit flat against and be secured to a flat surface which may be a blank wall.

The disc 8 is provided with a generally axially extending circumferential housing flange 10 projecting therefrom and the flange extends from the plate 8 a distance substantially as great as the width of the outer ring 5 of the bearing illustrated. The flange 10 from about its center portion to the end is preferably of generally spherical contour as indicated at 11 and the remainder of the inner surface toward the flange plate 8 may be generally cylindrical. The housing flange 10 at the inner side and preferably substantially at the juncture of the flange 10 and disc plate 8, is provided with a bead or like inwardly directed projection 12 for retaining the bearing ring 5 in place. The bead may be circumferentially continuous, or may be formed as a plurality of inwardly directed projections constituting the inner sides of dimples or punches 13 on the outside of the flange 10. It will be seen that the generally tapered or spherical surface 11 and the bead or propections 12 form what may be considered an inner surface or contour for the flange 10 which may be said to be substantially spherical so as to receive the crowned or generally spherical outer surface of the ring 5.

It will be seen that the ring 5 may have slight self-alignment in the housing. In assembling the bearing with the housing, it might be possible to put the bearing in place when the housing is in the condition shown in Fig. 3 and thereafter the bead 12 may be formed to hold the bearing in place. However, in the preferred form, the flange is formed as illustrated in Fig. 3 and then the bead 12 is formed therein as by means of a spinning or like operation, or by dimpling or punching the outer side of the flange, as shown in Fig. 4. In order to assemble the bearing with the housing, I preferably provide blanked assembly slots 14 at diametrically opposite sides of the flange 10; thus, the bearing 5 may be turned ninety degrees from the position shown in Fig. 1 and passed into the assembly slots 14, and thereafter tilted to the position shown in Fig. 1, after which the bearing will be held axially by the surface 11 and the bead 12, and self-alignment of the bearing in the housing will be possible.

When thin gauge metal is used for a bearing housing it may be desirable to double the metal upon itself for added strength, and this is so whether the housing is formed of one or two plates. In that form of the invention specifically shown in Fig. 5, the disc plate 8' is provided with a generally axially outwardly directed flange 15 about half the width of the bearing and a return bent flange 16 of about the full width of the bearing, so that the flange 16 when properly arched, or provided with a part arched, and beads or projections will provide a substantially spherical housing for the bearing and the center of the bearing will be substantially in line with the plane of the flange plate 8'. Thus, instead of having the entire bearing supported at one side of the plate disc 8, the bearing is supported at both sides of the disc and, as stated, its center is about coincident with the disc flange 8'. One of the flanges is provided with assembly slots as 14' for the purpose set forth. With that form of housing shown in Fig. 5, the wall on which the bearing is to be mounted would have to be provided with a hole for the housing or with projecting means for holding one of the flanges away from the wall.

It will be seen that I have provided a bearing housing which consists of a single piece which may be readily formed and pressed into shape. The bearing housing is cheap to manufacture and for normal loads, for which such bearing housing is designed, its strength will be adequate. Substantial end thrusts may be taken and, when an assembly slot is provided, the bearing may be readily applied and removed from the housing. Some self-alignment is permitted, thus adding to the flexibility of the combination.

While the invention has been described in considerable detail and preferred forms illustrated, it is to be understood that various changes may be made within the scope of the invention as defined in the appended claim.

I claim:

In a bearing housing, a flange plate to be secured to a support, said flange plate having a generally axial circumferential flange extending to one side of said plate, said flange at the axially outer end having a return bent flange on the inside of said first named flange and extending to the opposite side of said flange plate a distance substantially equal to the axial distance said first named flange extends from the flange plate, said return bent flange being of substantially spherical shape on the inside to receive a bearing of spherical shape, an outer bearing ring having a generally spherical outer surface fitting the spherical surface of said flange, at least one of said flanges having a pair of assembly slots to permit assembly of said outer ring and its flange.

References Cited in the file of this patent

UNITED STATES PATENTS

| | | |
|---|---|---|
| 1,266,061 | Scoville | May 14, 1918 |
| 1,577,211 | Erickson | Mar. 11, 1926 |
| 1,606,747 | Carter | Nov. 16, 1926 |
| 1,793,874 | Skillman | Feb. 24, 1931 |
| 1,924,072 | Lavigne | Aug. 22, 1933 |
| 1,934,527 | Dodge | Nov. 7, 1933 |
| 2,263,059 | Werme | Nov. 18, 1941 |
| 2,464,492 | Dimick | Mar. 15, 1949 |
| 2,475,393 | Keahey | July 5, 1949 |
| 2,501,100 | Shafer | Mar. 21, 1950 |
| 2,621,850 | Firth | Dec. 16, 1952 |

FOREIGN PATENTS

| | | |
|---|---|---|
| 312,107 | Germany | May 14, 1919 |